United States Patent [19]

Guillerot et al.

[11] Patent Number: 4,573,052

[45] Date of Patent: Feb. 25, 1986

[54] METHOD AND DEVICE FOR REDUCING THE POWER OF JAMMING SIGNALS RECEIVED BY THE SIDELOBES OF A RADAR ANTENNA

[75] Inventors: Jean C. Guillerot; Hubert Joncour; Gérard Auvray; Daniel Balduzzi, all of Paris, France

[73] Assignee: Thomson CSF, Paris, France

[21] Appl. No.: 369,119

[22] Filed: Apr. 16, 1982

[30] Foreign Application Priority Data

Apr. 30, 1981 [FR] France ................. 81 08667

[51] Int. Cl.$^4$ ............................................. G01S 7/36
[52] U.S. Cl. .................................... 343/18 E; 343/7.7; 343/381
[58] Field of Search ............... 343/7.7, 18 E, 381

[56] References Cited

U.S. PATENT DOCUMENTS

| | | | |
|---|---|---|---|
| 3,860,924 | 1/1975 | Evans | 343/7.7 |
| 3,881,177 | 4/1975 | Len et al. | 343/18 E |
| 4,070,675 | 1/1978 | Daniel et al. | 343/7.7 X |
| 4,075,633 | 2/1978 | Lewis | 343/18 E X |
| 4,086,592 | 4/1978 | Lewis et al. | 343/7.7 X |
| 4,093,948 | 6/1978 | Long | 343/7.7 X |
| 4,095,222 | 6/1978 | Mooney, Jr. | 343/7.7 X |
| 4,119,963 | 10/1978 | Zwarts et al. | 343/381 X |
| 4,459,700 | 7/1984 | Kretschmer, Jr. et al. | 343/7.7 X |
| 4,525,716 | 6/1985 | Carlin | 343/381 |

Primary Examiner—T. H. Tubbesing

Attorney, Agent, or Firm—Cushman, Darby & Cushman

[57] ABSTRACT

An apparatus and method for reducing the power of active jamming signals received by the sidelobes of a radar antenna. A known method includes providing a radar with a main antenna and N auxiliary antennas, each antenna being associated with a corresponding processing channel. The signals received by the N antennas are each given a weighting coefficient corresponding to jamming on that channel. The N signals are then combined to form a weighted linear combination which is subtracted from the main channel signal to provide a signal with reduced jamming. The present invention provides apparatus and method for reducing clutter signals (such as fixed echoes and thermal noise) from each of the signals received in the N channels, thus producing very accurate weighting coefficients thereby allowing jamming power to be further reduced. Apparatus and method are provided for carrying out moving target indication (MTI) on all channels, determining the jammed range cells by comparing the main channel signal with the auxiliary channel signals and validating these signals with respect to thermal noise, determining the weighting coefficients from information derived from a given number of jammed range cells (preferably those grouped together at the end of recurrence), forming the weighted linear combination from only those signals which are, in fact, jammed, and subtracting the weighted linear combination from the main channel signal.

10 Claims, 3 Drawing Figures

METHOD AND DEVICE FOR REDUCING THE POWER OF JAMMING SIGNALS RECEIVED BY THE SIDELOBES OF A RADAR ANTENNA

BACKGROUND OF THE INVENTION

This invention relates to a method and a device for power reduction of jammer signals received by the sidelobes of a radar antenna. As a rule, these signals are continuous or chopped active-jamming signals transmitted by a number of independent jammers and are received by the sidelobes of the radar antenna. The level of the signals is such that they are considered as real signals which originate from targets and completely disturb the operation of the radar.

In order to guard against active jamming of this type, the countermeasure known as sidelobe cancellation (SLC) has been proposed. A description of this technique may be found in an article by M. A. Johnson and D. C. Stoner "ECCM from the radar designer's viewpoint" published in the Microwave Journal, March 1978 issue, pages 59 and 60.

According to this technique, a number N of auxiliary antennas associated with N reception channels is employed in addition to the radar antenna and its corresponding processing channel. A weighted linear combination of the N complex signals delivered by the N auxiliary channels is formed and subtracted from the signal of the main channel, the weighting coefficients being determined from the signals received on the auxiliary channels in order to reduce the resultant jamming power on the main channel.

However, the effectiveness of the method outlined in the foregoing is evidently based on the determination of the gains relative to the jamming signals achieved by each auxiliary channel with respect to the gain of the main channel. It is observed under these conditions that any signal other than the jamming signals proper (i.e. thermal noise, clutter echoes, useful echoes) must also be considered as a clutter signal which has the effect of interfering with precise determination of the weighting coefficients and consequently impairs the quality of jamming suppression. Consequently in devices employed in the prior art, the measurement of weighting coefficients is such that the effective presence on the one hand of jamming and on the other hand of the above-defined clutter signals in the range gates forming "boxcars" or range cells which are chopped in the radar pulse-repetition periods is not taken into account. The weighting coefficients are therefore computed in an inaccurate manner.

SUMMARY OF THE INVENTION

An aim of the present invention is to define a method and a device for reducing the power of active-jamming signals in accordance with the sidelobe countermeasure technique and in which the disadvantages discussed above are overcome.

According to the invention, a method for reducing the power of jamming signals received by the sidelobes of a radar antenna with which auxiliary antennas are associated consists in forming a linear weighted combination of the complex signals delivered by the auxiliary channels which is subtracted from the signal of the main channel, said channels being associated respectively with the auxiliary antennas and with the main antenna with determination of weighting coefficients for reducing the resultant jamming power. The method is characterized by the steps which comprise:

carrying out on all channels a preliminary process of suppression of fixed echoes or slow-displacement echoes;

determining the jammed range cells by comparing the signal received in the main channel with the signals received respectively in the auxiliary channels with validation of the signals with respect to thermal noise;

determining the weighting coefficients from information delivered by a certain number of jammed range cells, preferably those which are grouped together at the end of recurrence;

forming the weighted linear combination of the signals relating to the only range cells which are in fact jammed, with the weighting coefficients determined earlier;

and subtracting the resultant signal of said combination from the main channel signal.

BRIEF DESCRIPTION OF THE DRAWINGS

Other features of the invention will be more apparent upon consideration of the following description and accompanying drawings, wherein.

DESCRIPTION OF THE INVENTION

Figure 1:
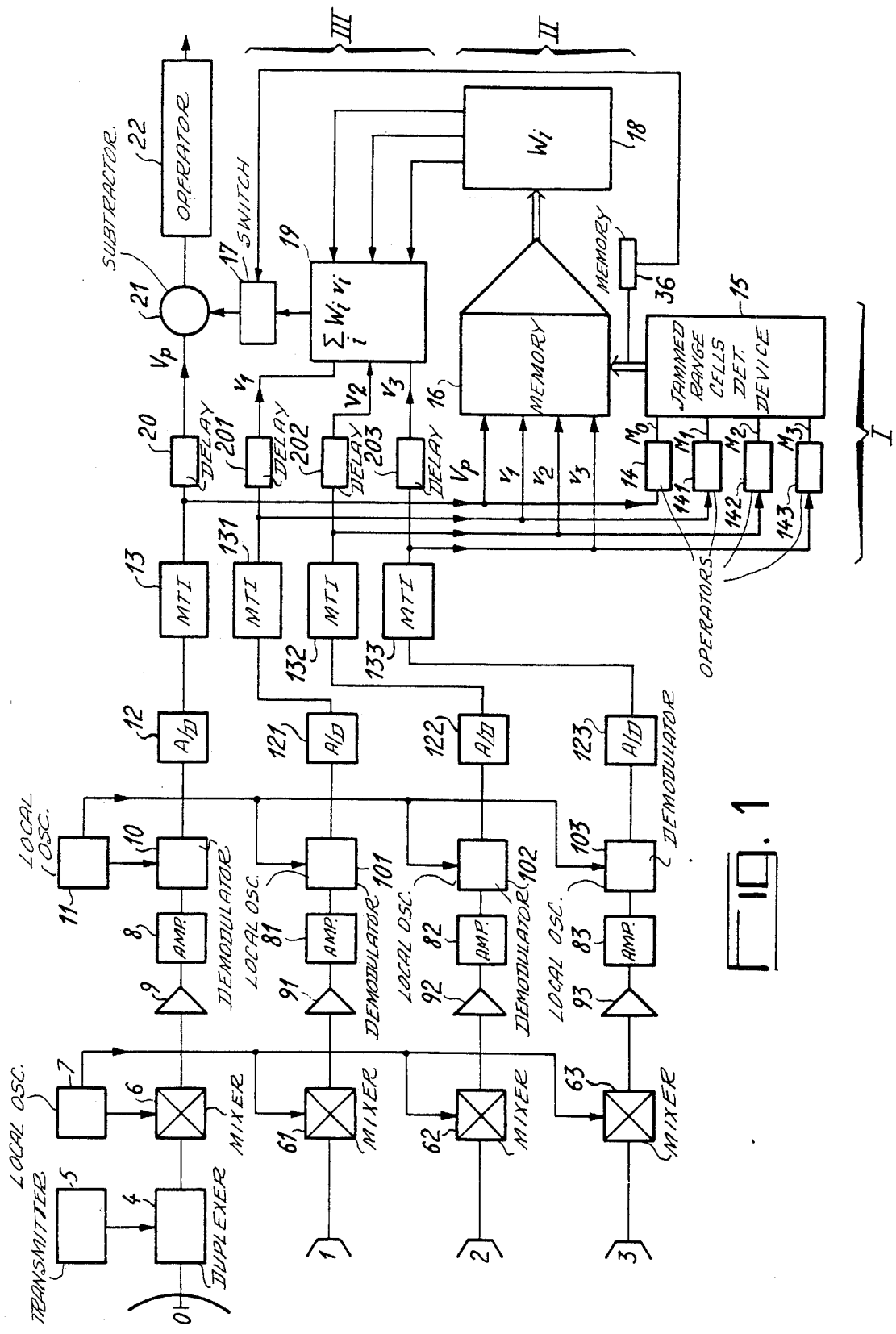
FIG. 1 is a schematic diagram of a device according to the invention.

In the known method of reduction of active jamming by the countermeasure technique designated as sidelobe cancellation (SLC), it is found that computation of the weighting coefficients to be employed in order to form the linear combination of the signals delivered by the auxiliary channels with a view to subsequently subtracting the resultant signal from the signal received in the main channel is lacking in accuracy since this calculation takes no account of interference signals other than the active-jamming signals whose power is to be reduced. In practice, said interference signals are thermal noise, clutter echoes and useful echoes which can be considered in this case as interference and mainly consist of high-power useful echoes at the start of a recurrence, that is to say at a short distance from the radar.

It is also noted that, in the prior art, computation of the weighting coefficients and the countermeasure are carried out on all range cells, whether they are jammed or not.

In the computation of weighting coefficients, a desired objective of the invention is to suppress the influence of interference signals (also known as clutter signals) in order to have coefficients which are determined with much greater accuracy and which will confer a much higher degree of accuracy on the final stage of the method adopted, thus making it possible to obtain a useful signal in which jamming will be considerably attenuated or even removed.

In a first step of the method according to the invention, a process for suppressing a certain number of clutter signals with maximum efficiency is carried out on all the radar channels, that is, on the main channel and on all the auxiliary channels. This process is known as fixed echo suppression in a known method designated as moving-target indication (MTI) which does not appear to call for any particular description as it is well known in the art.

The signals which have been subjected to this process of suppression of fixed echoes, or slow-displacement echoes, are then subjected to a process which consists in determining the range cells (or range gates forming boxcars) which are defined in each recurrence and are effectively jammed. This determination is performed by comparing, in the case of each range cell the intensity of the signal received in the main channel with the intensity of the signals received respectively in the different auxiliary channels. A range cell is then said to be jammed if the power of the corresponding signal received in an auxiliary channel is higher than the power of the corresponding signal received in the main channel.

The jammed range cell information thus determined is validated so as to take thermal noise into account. Validation consists in comparing the level of the jammed range-interval information with a threshold which is determined as a function of the thermal noise level.

After validation, the items of jammed range-interval information are stored in memory and a selection is made from these for computation of the weighting coefficients. The jammed range cell information employed in this computing operation is limited solely to items derived from range cells grouped together at the end of recurrence at which any clutter signal residues are very small and close high-power useful echoes are avoided.

The weighting coefficients thus computed, with higher accuracy than in the prior art, are utilized with a view to forming the linear combination of signals delivered by the auxiliary channels for effectively jammed range cells in the recurrence which has served for computation of said coefficients, subject to a time delay corresponding to one recurrence and to the time interval which is necessary for computation. The same process takes place in the case of each following recurrence. However, when the gain of the auxiliary channels varies only to a slight extent, computation of the weighting coefficients need not be repeated at each recurrence. The signal resulting from the linear combination is then deducted from the signal of the main channel, thus producing a useful signal in which the jamming power is considerably reduced or even suppressed.

It will be noted that, in accordance with the invention, since weighting is applied only to effectively jammed range cells, there is no deterioration of the information contained in unjammed range cells.

A device for carrying out the method according to the invention will now be described.

FIG. 1 represents a schematic diagram of a device for carrying out the method described above.

The device comprises a main antenna designated by the reference 0 with its channel for processing the signals received by the main antenna as well as a plurality of auxiliary antennas which can be omnidirectional, only three of which are shown by way of example in the figure and designated by the reference numerals 1, 2, 3, each of these latter being provided with a channel for processing the signals received respectively by the antennas. The main channel comprises a duplexer 4 connected on the one hand to a transmitter 5 and on the other hand to a mixer 6 connected to a local oscillator 7 and to an intermediate-frequency amplifier 8 through a preamplifier 9. The output of the intermediate-frequency amplifier 8 is connected to an amplitude-phase demodulator 10 and this latter is connected in addition to a local oscillator 11 which is different from the local oscillator 7. The demodulator 10 is connected to an analog-digital coder 12, the output of which is connected to a fixed-echo suppression (FES) (also known as Moving Target Indication (MTI)) filter 13. Each auxiliary processing channel comprises the same elements as the main channel except for the duplexer, these channels being employed only for signal reception.

As shown in FIG. 1, the following elements are connected directly to the auxiliary antennas: the mixers 61, 62, 63 supplied by the local oscillator 7, the preamplifiers 91, 92, 93, the intermediate-frequency amplifiers 81, 82, 83, the amplitude-phase demodulators 101, 102, 103 connected to the local oscillator 11, the analog-digital coders 121, 122, 123 and the MTI filters 131, 132, 133.

Part of the signal-processing operation according to the invention is assigned to each of three subassemblies and these latter are connected to the outputs of the MTI filters which carry out the first part of the method according to the invention.

A first subassembly I is intended to detect the presence of active jammers in range cells and comprises operators 14, 141, 142 and 143 connected respectively to the outputs of the MTI filters 13, 131, 132, 133. The design function of said operators is to determine the moduli of the signals delivered by the filters; said moduli supply the device 15 which detects jammed range cells. A second subassembly II comprises a device 16 for selection and storage in memory of the jammed range intervals employed for computation of the weighting coefficients $W_i$; said device is connected to the detection device 15, to the outputs of the MTI filters and to the device 18 which computes said weighting coefficients which are employed in the linear combination of the signals delivered by the auxiliary channels.

This second subassembly also comprises a second storage device 36 which has the intended function of locating the position of effectively jammed range cells in the recurrence considered. Said storage device is connected to a switch 17 which controls the connection between a device 19 (which performs the weighted summation of the signals of the auxiliary channels) and the subtraction device 21.

A third subassembly III which is also connected to the outputs of the MTI filters 13, 131, 132, 133 essentially comprises the aforementioned summation device 19 connected to the weighting-coefficient computation device 18. The summation device 19 performs weighted summation of signals which are derived solely from the auxiliary channels and applied to device 19 via delay circuits 201, 202, and 203, the time-delay of circuits 201, 202, and 203 being equal to the period of the recurrence and to the time taken to compute the coefficients. The output of the summation device 19 is connected to the subtracter 21 via the switch 17 which is controlled by the memory 36 as stated earlier. Said subtracter 21 is also connected to the output of the main channel via a delay element 20 which is similar to those already mentioned. The output of said subtracter is connected to an optional device device 22 in which known processing operations such as pulse compression, etc. are performed on the signals whose active-jamming power has been considerably reduced.

The operation of a device of this type will be explained in the description which now follows. It will be understood that several of the different circuit arrangements and components are known per se and that a full description of these known devices is consequently unnecessary.

The main processing channel delivers at the output of the amplitude-phase demodulator 10 the main signal which may contain a high-power jammer signal received by a sidelobe of the main antenna 0 in the form of its two quadrature components XoYo.

The auxiliary processing channels, whose design function is to sample jammer signals which enter the sidelobes of the main antenna, deliver at the output of their respective demodulators 101, 102, 103 the secondary signals in the form of their two quadrature components designated respectively by the references X1Y1, X2Y2 and X3Y3.

These analog signals are converted to digital signals respectively in the converters 12, 121, 122, 123 assigned to the different main and auxiliary channels and are subjected to a process for suppressing fixed signals or slow-displacement signals in the MTI filters 13, 131, 132 and 133 respectively.

At the output of the MTI filters, the signals, from which certain clutter signals defined at the beginning of this description have been removed with maximum efficiency, are applied to the different subassemblies I, II and III.

In the case of the first subassembly, the signals are applied to operators 14, 141, 142 and 143 which compute the moduli M0, M1, M2 and M3. A modulus is defined as an absolute value and in this application corresponds to digitized vectors of quadrature components X0Y0, X1Y1, X2Y2, X3Y3, respectively. These moduli are applied to the device 15 which detects the presence of interference with the main signal by the auxiliary signals. This device 15 determines the jammed range cells (also known as range gates or samples) by performing a comparison between the modulus of the main signal M0 and the moduli M1, M2, M3 of the auxiliary signals.

The information relating to the presence of jamming in the recurrence range cells delivered by the detection device 15 is stored in the memory device 36 (such as a shift register, for example), and also transmitted to the selection and storage device 16. Storage device 16 receives the signals of the main and auxiliary channels from the outputs of the MTI filters and permits selection and storage of the jammed range cells which will serve for computation of the weighting coefficients Wi in the device 18. Said weighting coefficients are transferred to the device 19 of the third subassembly III which performs the weighted summation $\Sigma_i W_i v_i$ of the signals of the auxiliary channels. In the example described, the coefficient i assumes the values 1, 2 or 3. The auxiliary signals delivered by the MTI filters 131, 132, 133 are previously delayed within the circuits 201, 202, 203 which can be memories or registers. The time delay produced by circuits 201, 202, and 203 corresponds to the time-duration of one recurrence to which is added the time required for computation of the coefficients. The resultant signal delivered by the device 19 represents the weighted summation of the auxiliary signals with the weighting coefficients computed in the device 18 which is connected to the device 16. In the case of the resultant signal, the parasitic jammer signals are essentially taken into account. The output signal of the weighted summation device 19 is applied to the subtracter 21 under the control of the switch 17 which is actuated by the memory 36. Thus, switch 17 acts to synchronize the arrival of the weighted-sum signal and the corresponding main channel signal at the subtractor 21. Therefore, the countermeasure, namely the subtraction of the weighted-sum signal from the main-channel signal, is carried out only in respect of range cells in which the presence of jamming has in fact been found. The weighted-sum signal therefore contains components whose value represents, with a good approximation, the value of the jamming signals picked-up by the sidelobes of the main antenna. In consequence, the addition of the signal resulting from the weighted linear combination within the subtraction unit 21 and of the main-channel signal Vp delivered by the MTI filter 13 via a delay circuit 20 (which is identical with the circuits 201, 202 and 203 forming part of the auxiliary channels) supplies a useful signal in which the jamming power is considerably reduced. It is worthy of note that this time-delay makes it possible to apply the weightings to the signals from which they have been computed. Said time-delay can be suppressed if the weighting coefficients vary at a sufficiently slow rate. However, depending on the frequency at which the differential gains of the antennas are modified (this frequency regulates the length of time during which the weighting coefficients remain stationary), renewal of the computation of the weighting coefficients is carried out in such a manner as to ensure that optimum reduction of jamming is always achieved. The output signal of the circuit 21 is a signal from which active jamming has been suppressed after reception of that signal by the sidelobes of the main antenna.

Figure 2:
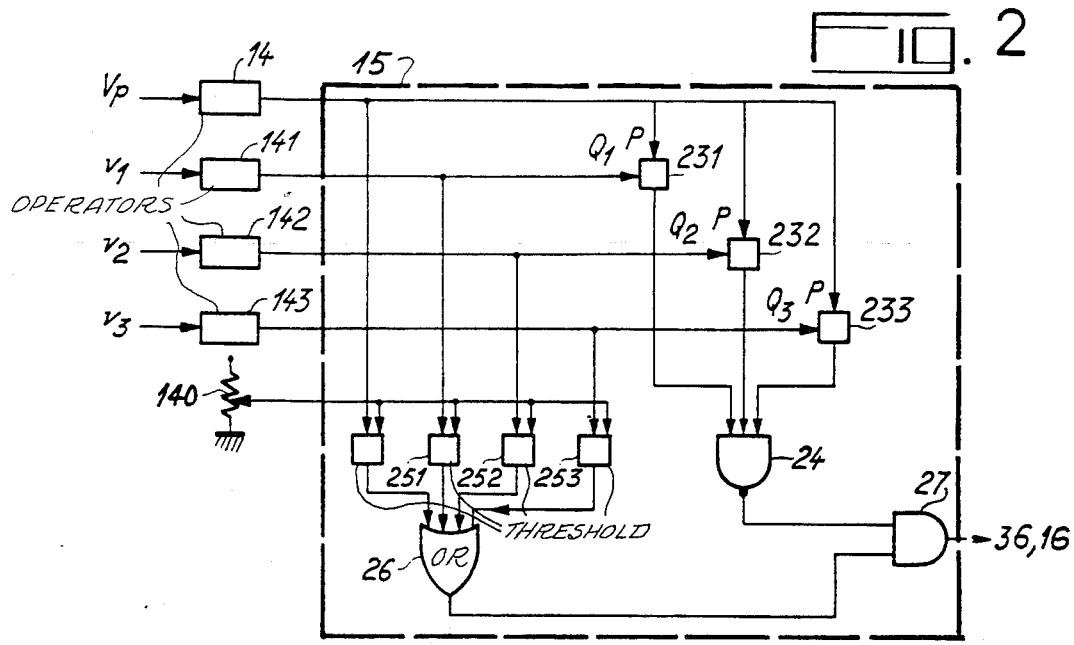
FIG. 2 is a schematic diagram of a device for the detection of jamming within the range intervals.
Figure 3:
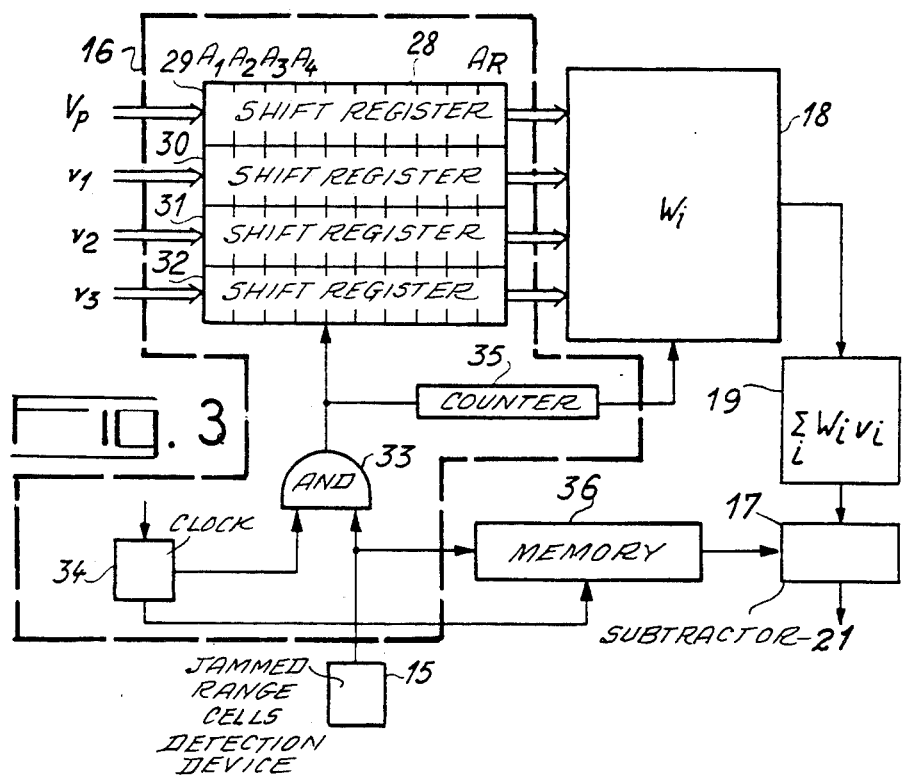
FIG. 3 is a schematic diagram showing a device for selection and storing in memory the jammed range intervals employed for computation of the weighting coefficients.

FIGS. 2 and 3 are schematic diagrams showing respectively the device 15 for detecting jammed range intervals and the device 16 for selecting and storing said intervals in memory.

The detection device shown in FIG. 2 comprises comparators 231, 232, 233 (which are connected to the operators 14, 141, 142, 143 for computing the moduli M of the signals derived from the main and auxiliary channels) the outputs of which are connected to a NAND-circuit 24. The operators 14, 141, 142, 143 are also connected to threshold circuits 25, 251, 252 and 253 which are connected via an OR-circuit 26 to an output AND-circuit 27. The other input of AND-circuit 27 is the output of the NAND-circuit 24. The AND-circuit 27 is connected to the memory 36 and selection circuits shown in FIG. 3.

The operation of the device for detecting the presence of jamming as shown in FIG. 2 is based on the principle that a range cell is said to be jammed when the power received in at least one of the auxiliary channels is higher than that of the main channel.

Each comparator 231, 232 and 233 is connected via an input P to the output of the operator 14 for computing the modulus of the signal Vp of the main channel and via an input Q1, Q2, Q3 respectively to the outputs of the operators 141, 142 and 143 for computing the moduli of the signals v1, v2, v3 of the auxiliary channels. Since the comparators operate in positive logic, the logical state of one of the comparators Ci is given by the following truth table: if the input P of the comparator Ci is higher than the input Qi, the output of the comparator Ci is a logical 1 whereas, if the input P is lower than the input Qi, the output of the comparator Ci is a logical 0.

Inputs: $P \geq Q_i$; $P < Q_i$.
Outputs: 1; 0.

The logical state 0 at the output corresponds to the presence of jamming in the case of the main channel/auxiliary channel pair i within the range cell considered. Since the outputs of the comparators are grouped together at the input of the NAND-circuit 24, NAND-circuit 24 thus delivers a jammed range cell item of information as soon as the level received in at least one auxiliary channel is higher than the level received in the main channel. This jammed range cell information is transmitted to the memory device 16 via an AND-circuit 27 and then transmitted by memory device 16 only after it has carried out a validation operation in order to take the existing thermal noise into account. This validation operation is based on a comparison of the level of the signals derived respectively from the operators 14, 141, 142, 143 (of the main and auxiliary channels) with a threshold value which is a function of the thermal noise level. This threshold value is determined by the resistor 140 in the circuits 25, 251, 252, 253, the outputs of which are grouped together at the input of an OR-circuit 26, the output of which is connected to the AND-circuit 27; and the AND-circuit 27 delivers the jammed range cell information which has been validated.

The jammed range cell information is recorded in the memory circuits 16 and 36 as already mentioned earlier.

FIG. 3 illustrates one device for carrying out a jammed range cell selection, the information of which is employed for computing the weighting coefficients Wi. The device comprises a memory circuit 28 consisting of an array of shift registers 29, 30, 31, 32 comprising a predetermined number of elements $A_1$–$A_R$ corresponding to the optimum number of jammed range cells to be considered for computation of the weighting coefficients. This number thus already establishes a certain selection. The registers are supplied respectively with information delivered by the main and auxiliary channels, namely those designated by the references Vp, v1, v2 and v3. The memory assembly 28 operates according to the principle of shift registers. However, this assembly has a distinguishing feature in that the first input information is the first output and that only certain items of information are recorded therein, namely those corresponding to range cells which are effectively jammed. Storage of information is thus performed under the control of data which indicate the jammed range cells delivered by the jamming detection device 15. Writing of data in the memory 28 is controlled by a group of circuits comprising a clock 34 for defining the range cells within one recurrence, the jammed range cells detector 15 and an AND-circuit 33 to which the two circuits 34 and 15 are connected. It is thus clear that only those data corresponding to effectively jammed range cells are recorded in the memory 28. Thus, the first data item of this type is recorded in an element designated as $A_1$, the second data item is also recorded in said element $A_1$ and the information previously retained in this latter passes into the element designated as $A_2$, and so on in sequence.

It has been noted from the foregoing that, in accordance with the invention, it was desirable to choose jammed range cell information located at the end of recurrence for computing weighting coefficients. It is also clear that the memory 28 will not be capable of recording a number of jammed range cell data items exceeding R. In the event that the number of jammed range cell items should be higher than this number R, the memory would record only R corresponding to the R last range cells which are the most remote or in other words located at the end of recurrence. Computation of the weighting coefficients Wi is carried out, within the device 18 to which the memory 28 is connected, on the R samples which have thus been selected.

Should the number R', for example, of the jammed range cells be lower than the optimum number R of range cells which can be stored in memory, computation of the weighting coefficients is performed with these R' samples and this information is transmitted to the computing device 18 by the counter 35. The counter 35 counts the number of range cells stored in memory within the memory 28 and, at the end of recurrence, transmits that number to the computing device 18. Furthermore, a memory device 36, which can consist of a shift register or a delay line, is connected between the jamming detection device 15 and the switch 17 for controlling the entry of the signals derived from the summing device 19 into the subtracter 21. The memory 36 such as a shift register, for example, is controlled by the clock 34 and is intended to check the position of effectively jammed range cells within the recurrence considered. The memory 36 also has the function of delaying, by a time interval T, the arrival of effectively jammed range cell data for which the weighted linear combination is formed (said linear combination is consequently formed only in the case of effectively jammed range cells). The time interval T is equal to the time of computation of the weighting coefficients Wi increased by the duration of one recurrence.

It will be noted that the time-delay is not necessary for all the recurrences when the variation in gain of the auxiliary antennas is low from one recurrence to the next. In this case, the computation of the weighting coefficients remains valid for several recurrences.

In the following description, consideration may be given by way of example to a method of computation of the weighting coefficients Wi, the computation being usually performed in a programmable operator.

The references $V_p(r)$, $v_1(k)$, $v_2(k)$, $v_3(k)$ designate respectively the complex signals derived from the main channel and auxiliary channels at the output of the MTI filters 13, 131, 132, 133 corresponding to the $k^{th}$ selected optimum jammed sample. There are computed on the one hand the functions of covariance $\gamma_{ij}$ of the auxiliary signals with respect to each other:

$$\gamma_{ij} = \sum_k v_i(k) v_j^*(k)$$

where
  $3 \geq j \geq i$, $i = 1, 2, 3$ while noting that
  $\gamma_{ji} = \gamma^*_{ij}$ the sign * designating the conjugate of the quantity to which it applies,
and on the other hand the intercorrelation functions $C_i$ between the main signal and the auxiliary signals:

$$C_i = \sum_k V_p(k) v_i^*(k) \quad i = 1, 2, 3$$

There are then obtained the nine following quantities:

$$\begin{cases} \gamma_{11}, \gamma_{22}, \gamma_{33}, \gamma_{12}, \gamma_{13}, \gamma_{23} \\ C_1, C_2, C_3 \end{cases}$$

The following values are determined:

$$m_{11} = \gamma_{22}\gamma_{33} - |\gamma_{23}|^2$$

$$m_{22} = \gamma_{11}\gamma_{33} - |\gamma_{13}|^2$$

$$m_{33} = \gamma_{11}\gamma_{22} - |\gamma_{12}|^2$$

$$m_{21} = \gamma_{13}{}^*\gamma_{23} - \gamma^*{}_{12}\gamma_{33}$$

$$m_{31} = \gamma_{12}{}^*\gamma_{23}{}^* - \gamma^*{}_{13}\gamma_{22}$$

$$m_{32} = \gamma_{13}{}^*\gamma_{12} - \gamma_{11}\gamma_{23}{}^*$$

then the expression $\Delta = m_{11}\gamma_{11} - m_{21}\gamma_{12} + m_{31}\gamma_{13}$ The following coefficients are then calculated:

$$n_{11} = \frac{m_{11}}{\Delta} \quad n_{22} = \frac{m_{22}}{\Delta} \quad n_{33} = \frac{m_{33}}{\Delta}$$

$$n_{21} = \frac{m_{21}}{\Delta} \quad n_{31} = \frac{m_{31}}{\Delta} \quad n_{32} = \frac{m_{32}}{\Delta}$$

and the desired weighting coefficients are finally obtained:

$$W_1 = n_{11}C_1 + n_{21}C_2 + n_{31}C_3$$
$$W_2 = n^*{}_{21}C_1 + n_{22}C_2 + n_{32}C_3$$
$$W_1 = n^*{}_{31}C_1 + n^*{}_{32}C_3 + n_{33}C_3$$

It will be noted that the number of samples on which the covariance and intercorrelation functions have been computed is a variable parameter which can be adapted as a function of the search of a compromise between reduction of jamming and simplicity of operations.

A method and a device for reducing the power of jamming signals received by the sidelobes of a radar antenna have thus been described.

While the invention has been described in connection with what is presently considered to be the most practical and preferred embodiments, it is understood that the invention is not to be limited to the disclosed embodiment but, on the contrary, is intended to cover various modifications and equivalent arrangements included within the spirit and scope of the appended claims which scope is to be accorded the broadest interpretation so as to encompass all such modifications and equivalent structures.

What is claimed is:

1. A method for reducing the power of jamming signals received by the sidelobes of a radar main antenna with which auxiliary antennas are associated, said main antenna being associated with a main channel which process a main channel signal, each one of said auxiliary antennas being associated with one of a plurality of auxiliary channels each one of which processes an auxiliary channel signal, respectively, said radar including a plurality of range cells which are jammed or unjammed, said radar emitting a signal which is returned in a recurrence of associated main channel and auxiliary channel signals, comprising the steps of:
carrying out on all said channels a preliminary process of suppression of fixed echoes and slow-displacement echoes by means of moving target indication;
determining which ones of said range cells are jammed by comparing said main channel signal with the signals processed respectively by said auxiliary channels;
validating the jammed range cells with respect to thermal noise;
determining weighting coefficients from a certain number of jammed range cells;
forming a weighted linear combination signal relating solely to said jammed range cells with the weighting coefficients determined earlier; and
subtracting said weighted linear combination signal from said main channel signal to produce an output signal with reduced jamming power.

2. A method according to claim 1, wherein said step of determining the jammed range cells is performed on one recurrence and includes the step of storing information items associated with the jammed range cells in memory so as to ensure that only the jammed range cell information items corresponding to jammed range cells located at an end of said one recurrence are employed during said step of determining the weighting coefficients, said step of forming said weighted linear combination being performed with the weighting coefficients thus computed during said one recurrence, said auxiliary channel signals being delayed by a time interval equal to the duration of said one recurrence plus the actual time of computation of said weighting coefficients.

3. A method according to claim 1, wherein said method is applied successively to each one of a plurality of said recurrences except in the event of a sufficiently low rate of variation in the gain of the auxiliary antennas and consequently a sufficiently low rate of variation in said weighting coefficients in which event said weighting coefficients can be applied to several recurrences in succession.

4. Apparatus for reducing the power of jamming signals received by the sidelobes of a radar main antenna with which are associated a plurality of auxiliary antennas, said main antenna being associated with a main channel which processes a main channel signal, each one of said plurality of auxiliary antennas being associated with one of a plurality of auxiliary channels each one of which processes an auxiliary channel signal, respectively, said radar including a plurality of range cells which may be jammed or unjammed, said radar emitting a signal which is returned in a recurrence of associated main channel and auxiliary channel signals, comprising:
filter means adapted for connection in each of said channels for performing a moving target indication operation on said main channel and auxiliary channel signals;
jammed range cells detection means, connected to said filter means, for detecting which ones of said range cells are jammed in said recurrence;
memory means, connected to said jammed range cells detection means, for recording positions of jammed range cells in said recurrence;
means, connected to said filter means and to said jammed range cells detection means, for selecting and storing certain ones of said jammed range cells;
means, connected to said selecting and storing means, for determining weighting coefficients for said certain ones of said jammed range cells;

weighted summation means, connected to said weighting coefficents determining means and to the filter means associated with said auxiliary channels, for forming a weighted linear combination signal, relating solely to said jammed range cells, from said weighting coefficients;

switch means, controlled by said memory means and connected to said weighted summation means, for supplying said weighted linear combination signal synchronous with an associated main channel signal; and subtracter means, connected to said switch means and to said main channel filter means, for subtracting said weighted linear combination signal from said main channel signal to produce an output signal having reduced jamming power.

5. Apparatus according to claim 4 further including operator means, connected between said filter means and said jammed range cells detection means, for calculating moduli of said main channel and auxiliary channel signals.

6. Apparatus according to claim 5 wherein said operator means includes a plurality of individual operator means each associated with one of said main and auxiliary channels, and wherein said jammed range cells detection means includes:

a plurality of comparison means, each one connected to a separate auxiliary channel individual operator means and to a main channel individual operator means, for providing signals indicating which of said auxiliary channels are jammed;

a plurality of threshold means, each one connected to a separate auxiliary channel individual operator means and to a main channel individual operator means, for providing signals indicating that said jammed auxiliary channels do not exceed a clutter noise threshold;

OR-gate means, connected to said plurality of threshold means, for providing a signal when any of said jammed auxiliary channels do not exceed said threshold;

NAND-gate means connected to said plurality of comparison means, for providing a signal when any of said auxiliary channels is jammed; and AND-gate means, connected to said OR-gate means and to said NAND-gate means, for providing a signal when any of said auxiliary channels is jammed and any of said jammed auxiliary channels do not exceed said threshold.

7. Apparatus according to claim 4 wherein each one of said plurality of threshold means includes a resistor having a value indicative of thermal noise.

8. Apparatus according to claim 4 wherein said selecting and storing means includes:

an array of shift registers, each shift register of said array having an input connected to one of said filter means, respectively;

AND-circuit means, connected to said shift register array and to said jammed cells detecting means, for controlling the selection and storage of certain ones of said jammed range cells; and clock means for providing range cell timing information to said AND-circuit means.

9. Apparatus according to claim 8 wherein each of said shift registers includes an optimum number of memory elements, said optimum number corresponding to an optimum number of jammed range cells which are grouped at an end of said recurrence, and wherein said selecting and storing means further includes counter means, connected between said AND-circuit means and said weighting coefficients determining means, for indicating a number of jammed range cells to be used in determining said weighting coefficients.

10. Apparatus according to claim 4 further including delay means, connected to said filter means, for delaying said main channel and said auxiliary channel signals by a period of time equal to a recurrence period plus time required for determining said weighting coefficients.

* * * * *